Oct. 24, 1933.  C. DÉVÉ  1,931,955
PROJECTION APPARATUS
Filed Sept. 5, 1929   2 Sheets-Sheet 1

Oct. 24, 1933.  C. DÉVÉ  1,931,955
PROJECTION APPARATUS
Filed Sept. 5, 1929   2 Sheets-Sheet 2
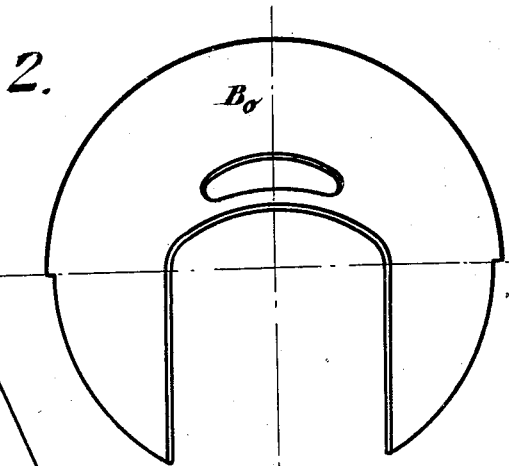
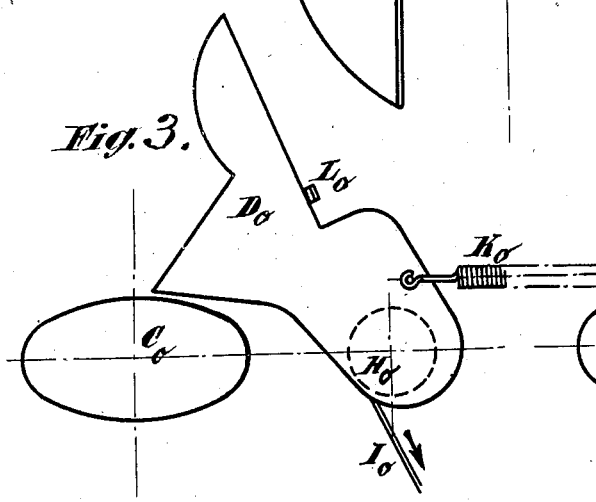
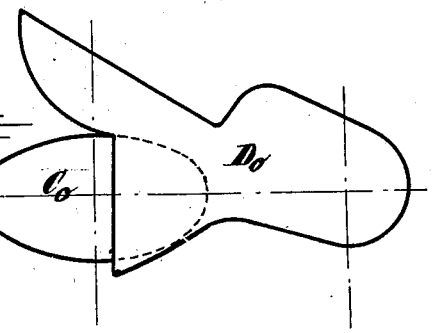
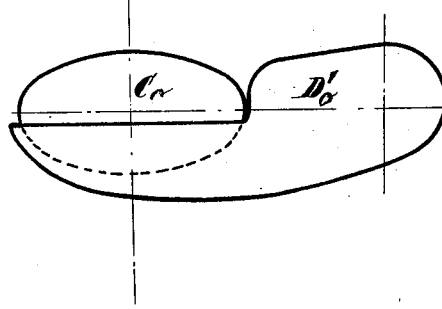
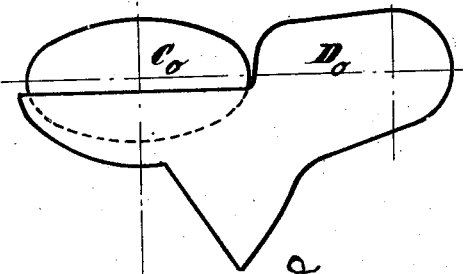

Patented Oct. 24, 1933

1,931,955

UNITED STATES PATENT OFFICE 1,931,955

PROJECTION APPARATUS

Charles Dévé, Paris, France

Application September 5, 1929, Serial No. 390,619, and in France September 28, 1928

3 Claims. (Cl. 240—41.3)

The present invention relates to light projecting apparatus and more especially headlights for automobile and other vehicles.

The object of my invention is to provide apparatus of that kind in which the whole amount of the light emitted by a luminous source or by a source of infra-red or ultra-violet rays is concentrated upon a region or area of any desired size and of constant or variable shape located at any desired distance from the apparatus.

To this effect, the apparatus according to my invention comprises a source of light, one or more reflectors for collecting the whole, or substantially the whole of the light rays emitted by said source, reflecting means for concentrating said light rays, a lens, and at least one movable diaphragm.

A preferred embodiment of my invention will be hereinafter described with reference to the accompanying drawings, given merely by way of example, and in which:

Fig. 2 is an end view of a detail of Fig. 1;

Figs. 3 to 6 show different positions of the movable diaphragm, Figs. 3, 4 and 6 corresponding to a headlight disposed on the left hand side of a vehicle and Fig. 5 to a headlight disposed on the right hand side of a vehicle.

Figure 1:
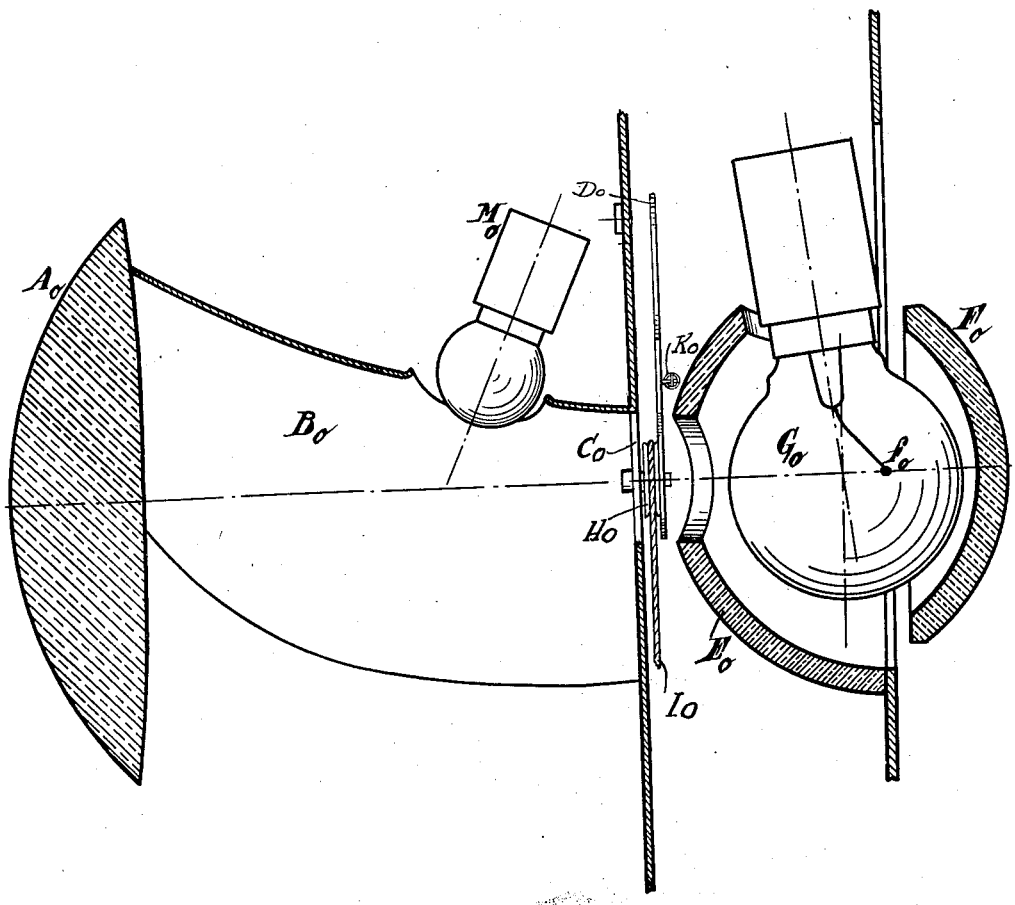
Fig. 1 is a diagrammatical view of an embodiment of my invention more especially adapted to be used as a vehicle headlight.

As shown in Fig. 1, my apparatus comprises a lamp Go located between the two reflectors Eo and Fo which collect nearly the whole of the luminous flux emitted by said lamp. The hemispherical reflector Eo is substantially centered on the filament fo of lamp Go. All the light of the lamp falling on said mirror Eo is reflected to said filament. The other concave mirror Fo receives one half the flux emitted directly by the filament and the whole of the flux reflected by hemispherical mirror Eo. The shape of the rear reflector Fo is such that it will project into the aperture provided in the front mirror Eo all the light rays that it receives. The filament of the lamp is eccentrically disposed so that it may be located near the focus of the rear mirror.

The light concentrating organ Bo (Figs. 1 and 2) is of the shape of a saddle. This organ is cut away longitudinally and its lower portion is removed, to prevent dazzling. Due to this shape of organ Bo, the light reflected therefrom is spread out in such manner that there will be no demarcation between the light emitted directly through the aperture and the light reflected from organ Bo. At its upper part, this organ Bo is provided with a small aperture adapted to receive the small electric lamp Mo adapted to town lighting. See also Fig. 2.

At the focus of lens Ao there is disposed a screen Do of special shape, adapted to be used for antidazzling lighting. In the position shown in Fig. 3, screen Do is fully opened and the field is lighted to the maximum. The headlights project upon the road an oval beam Co resembling the restricted section of said beam. In the position of the screen shown in Fig. 6 the headlight gives an anti-dazzling lighting, that is to say the screen leaves unlightened all the portion of the field that is located above one meter from the surface of the road, since the lens gives a reversed image of the restricted beam and of the screen. The light and dark parts are sharply separated since the line of separation corresponds to the projection of a screen located at the focus of the lens.

The screen of Figs. 3, 4 and 6 corresponds to the headlight disposed on the left hand side of the car. Fig. 5 shows the screen D'o used in connection with the headlight located on the right hand side of the car (and which is of a slightly different shape) in the closed position, that is in the position corresponding to the antidazzling effect.

Since the beam Co can be divided vertically as well as horizontally, the screen of the headlight located on the left hand side of the car is so shaped as to be capable of leaving the side of the road occupied by the vehicles coming in the opposite direction in the darkness. This is shown in Fig. 4. It has been assumed that the vehicles travel on the right hand side of the road. The driver uses the last mentioned position (Fig. 4) instead of that of Fig. 6 when the latter cannot be employed on account of up-and-down roads. When one of the headlights is in the position corresponding to Fig. 4, the other headlight is put out so as not to dazzle. The rear faces of screens Do and D'o may form reflectors which complete the action of mirror Eo.

Fig. 1 shows the device for the control of the shutter Do.

It consists of a traction wire device (Bowden) Io passing over a pulley Ho and a reaction spring Ko. Of course I do not intend to be limited to these means of controlling screens Do.

What I claim is:—

1. A projection apparatus particularly applicable to automobile headlights comprising in combination a source of light, a reflector disposed back of said source of light and adapted to give a real image thereof in front of said source, a spherical reflector provided with an aperture disposed in front of said source of light and having its center of curvature on said source of light, said two reflectors being so combined as to receive substantially the whole of the light rays issuing from the source, a reflecting element approximating the shape of a portion of the surface of a frustum of a cone but with a slight longitudinal inward convexity disposed in front of said opening with its narrow part in the vicinity of the restricted portion of the light beam issuing from said aperture, a lens disposed in front of the last-mentioned element, and a screen adapted to be disposed in the path of the light rays and adapted to complete the spherical reflector.

2. An automobile headlight comprising in combination an electric lamp having its filament in an eccentric position, a spherical mirror disposed back of said lamp and having its focus on said filament, a spherical mirror provided with an aperture disposed in front of said lamp and having its center of curvature on said filament, said two reflectors being so combined as to receive substantially the whole of the light rays issuing from the source, a saddle shaped reflecting element approximating to the shape of a portion of a cone, but with a slight longitudinal inward convexity, cut away in its lower part disposed in front of said aperture with its narrow part in the vicinity of the restricted portion of the beam of light issuing through said aperture, a convergent lens in front of said saddle-shaped reflecting element, a movable screen disposed in the focal plane of said lens between said aperture and said lens, and means for bringing said screen in front of the aperture in a centered position with respect to the front reflector, whereby a part of the light beam can be cut off so as to light only a determined area but without losing anything of the luminous flux of the source of light.

3. A projection apparatus particularly applicable to automobile headlights comprising in combination a source of light, a reflector disposed back of said source of light and adapted to give a real image thereof in front of said source, a spherical reflector provided with an aperture disposed in front of said source of light and having its center of curvature on said source of light, said two reflectors being so combined as to receive substantially the whole of the light rays issuing from the source, a saddle shaped reflecting element approximating the shape of a portion of a cone but with a slight longitudinal inward convexity cut away in its lower part disposed in front of said opening with its narrow part in the vicinity of the restricted portion of the light beam issuing from said aperture, a lens disposed in front of the last mentioned element, and a screen adapted to be disposed in the path of the light rays in front of the aperture in said spherical reflector, and between said reflector and the last mentioned reflecting element.

CHARLES DÉVÉ